(12) United States Patent
Zhou et al.

(10) Patent No.: US 8,577,138 B2
(45) Date of Patent: Nov. 5, 2013

(54) COLOR ROLLING DETECTION METHOD AND DETECTION DEVICE

(75) Inventors: Xiaobo Zhou, Shanghai (CN); Keisuke Okamura, Tokyo (JP); Koichiro Seo, Tokyo (JP)

(73) Assignee: Sony Corporation, Tokyo (JP)

( * ) Notice: Subject to any disclaimer, the term of this patent is extended or adjusted under 35 U.S.C. 154(b) by 224 days.

(21) Appl. No.: 13/168,356

(22) Filed: Jun. 24, 2011

(65) Prior Publication Data

US 2011/0317911 A1    Dec. 29, 2011

(30) Foreign Application Priority Data

Jun. 25, 2010  (CN) .......................... 2010 1 0215975

(51) Int. Cl.
*G06K 9/00*    (2006.01)
(52) U.S. Cl.
USPC .......................................................... 382/165
(58) Field of Classification Search
USPC ................. 382/162–165, 167, 254, 272–274;
348/208.1, 221.1, 223.1, 225.1, 226.1,
348/229.1, 362, 364–365; 358/515–520
See application file for complete search history.

(56) References Cited

U.S. PATENT DOCUMENTS

| | | | |
|---|---|---|---|
| 7,639,284 B2 * | 12/2009 | Kinoshita | 348/226.1 |
| 8,395,679 B2 * | 3/2013 | Kang et al. | 348/229.1 |
| 2005/0179789 A1 * | 8/2005 | Horie | 348/223.1 |
| 2005/0253941 A1 * | 11/2005 | Taura | 348/272 |
| 2011/0317027 A1 * | 12/2011 | Shinmei et al. | 348/223.1 |
| 2011/0317028 A1 * | 12/2011 | Shinmei et al. | 348/223.1 |

* cited by examiner

*Primary Examiner* — Jose Couso
(74) *Attorney, Agent, or Firm* — Oblon, Spivak, McClelland, Maier & Neustadt, L.L.P.

(57) ABSTRACT

The present invention discloses a color rolling detection method and detection device for an input image, which can detect a phenomenon of color rolling in the image rapidly, efficiently and at a low cost. The detection method includes the steps of: an extracting step for extracting parameter values indicative of the color or brightness of the image in a detection time period T3; a preprocessing step for performing a preprocess to the extracted parameter values so as to obtain characteristic values of the image; an initial value setting step for obtaining a first initial value from the characteristic values in an initialization time period of the detection time period T3; an average value calculating step for calculating, with respect to each detection cycle T2 in the detection time period T3, an average value on the time axis of the characteristic values in the detection cycle T2 based on the obtained first initial value; and a detecting step for detecting whether there exists in the detection time period T3 such a detection cycle T2 that the characteristic values in the detection cycle T2 always maintain a deviation in a specific direction relative to the average value thereof, wherein if so, then occurrence of the color rolling is judged; otherwise, no occurrence of the color rolling is judged.

19 Claims, 5 Drawing Sheets

COLOR ROLLING DETECTION METHOD AND DETECTION DEVICE

FIELD OF THE INVENTION

The present invention generally relates to the field of image processing, and more particularly, to a method and device for detecting color rolling of an image.

BACKGROUND OF THE INVENTION

Along with increasing popularization of a surveillance system in commercial and civil applications, surveillance cameras have been widely applied in various fields for the purpose of guaranteeing public security. The majority of the surveillance cameras are in a 24-hour operation and have to output an image with stable quality regardless of the daytime or nighttime. Therefore, imaging in any high-end product of the surveillance cameras has to be characterized by a broad dynamic range, high reliability, etc. A predominant technology of a CCD camera is to capture an image by a multi-shutter method. However, the surveillance camera when used may suffer from a phenomenon of "color rolling" in case where a fluorescent lamp serves for illumination. As illustrated in FIG. 1, the difference between the frequency of the fluorescent lamp and that of the camera causes shifting of a sampling point of the camera, and consequently the amount of incident light sampled by the camera differs from the spectral distribution. Thus, an image processed by the camera is subject to color rolling. That is, the image may turn from white to blue, pink and back to white, and such a process will be repeated.

In an existing method for detecting color rolling, waveforms during color rolling have to be stored, and this requires a considerable memory and a significant effort of calculation, which may be inappropriate for hardware or for a microcontroller with a poor calculation capacity, and also lacks a good real time property.

Furthermore, a color rolling improvement function has been developed in the prior art to address the problem of color rolling. However, an image generated by a high-speed shutter might fade in color under certain conditions if the color rolling improvement function were enabled in the case of color rolling not being detected.

SUMMARY OF THE INVENTION

In view of the foregoing, a color rolling detection is desired to detect rapidly and accurately color rolling without a considerable memory and a high data processing capacity, for lowering the cost thereof and improving the efficiency of detecting color rolling.

An object of the invention is to provide a color rolling detection method for detecting a phenomenon of color rolling in an image rapidly, efficiently and at a low cost.

According to an aspect of the invention, there is provided a color rolling detection method for an input image, which includes the steps of:

an extracting step for extracting parameter values indicative of color or brightness of the image in a detection time period $T3$ which satisfies relations of $T3=m \times T2$ and $T3 \geq T/2$, wherein $T2$ is representative of a detection cycle within the detection time period $T3$, $T$ is representative of a predetermined color rolling cycle, and $m>1$, and the detection cycle $T2$ satisfies a relation of $T2<T/2$;

a preprocessing step for performing a preprocess to the extracted parameter values, so as to obtain characteristic values of the image;

an initial value setting step for obtaining a first initial value for calculating an average value of the characteristic values based on the characteristic values in an initialization time period of the detection time period $T3$;

an average value calculating step for calculating, with respect to each detection cycle $T2$ within the detection time period $T3$, the average value of the characteristic values in the detection cycle $T2$ on a time axis based on the first initial value obtained in the initial value setting step; and a detecting step for detecting whether there exists in the detection time period $T3$ such a detection cycle $T2$ that the characteristic values within the detection cycle $T2$ always maintain a deviation in a certain direction relative to the average value of the characteristic values within the detection cycle $T2$ on the time axis, wherein if such a detection cycle $T2$ is detected, it is judged that color rolling occurs, and otherwise it is judged that the color rolling does not occur.

In a preferred embodiment, the method according to the invention can further include a controlling step for enabling a color rolling improvement function in case that occurrence of the color rolling is detected in the detecting step, and prohibiting the color rolling improvement function in case that no occurrence of color rolling is detected.

Thus, the color rolling improvement function can be enabled only upon detection of a color rolling status, and in this way, it is possible to eliminate an adverse effect of fading in color of an image generated by a high-speed shutter under some conditions, which may result from enabling of the color rolling improvement function in the case of color rolling not being detected.

According to another aspect of the invention, there is provided a color rolling detection device for an input image, which includes:

an extracting unit configured to extract parameter values indicative of color or brightness of the image in a detection time period $T3$ which satisfies the relations of $T3=m \times T2$ and $T3 > T/2$, wherein $T2$ is representative of a detection cycle within the detection time period $T3$, $T$ is representative of a predetermined color rolling cycle, and $m>1$, and the detection cycle $T2$ satisfies a relation of $T2<T/2$;

a preprocessing unit configured to perform a preprocess to the extracted parameter values so as to obtain characteristic values of the image;

an initial value setting unit configured to obtain a first initial value for calculating an average value of the characteristic values based on the characteristic values in an initialization time period of the detection time period $T3$;

an average value calculating unit configured to calculate, for each detection cycle $T2$ in the detection time period $T3$, the average value of the characteristic values in the detection cycle $T2$ on a time axis based on the obtained first initial value; and a detecting unit configured to detect whether there exists in the detection time period $T3$ such a detection cycle $T2$ that the characteristic values within the detection cycle $T2$ always maintain a deviation in a certain direction relative to the average value of the characteristic values within the detection cycle $T2$ on the time axis, wherein if such a detection cycle $T2$ is detected, a detection result that color rolling occurs is obtained, and if such a detection cycle $T2$ is not detected, a detection result that the color rolling does not occur is obtained.

According to still another aspect of the invention, there is provided an image pickup equipment equipped with the foregoing device.

According to a further aspect of the invention, there is provided a program product stored with a machine-readable instruction code, when said instruction code is read and executed by a machine, the color rolling detection method for an input image according to the embodiment of the invention as described above can be executed.

According to a further aspect of the invention, there is provided a storage medium carrying the program product as described above.

According to the invention, the input image is processed so as to detect rapidly and accurately color rolling. Since it is not necessary to store waveforms during occurrence of the color rolling, a large memory space can be dispensed with, and this will be appropriate especially for hardware or for a microcontroller with a poor calculation capacity, e.g., a microprocessor for a surveillance camera. It can be appreciated that the color rolling detection method according to the invention is also applicable to other systems in need of detecting occurrence of the color rolling, e.g., an ordinary camera, a video camera system, etc.

Furthermore, the color rolling detection function can be controlled in response to the detection result in such a way that, it is possible to enable the color rolling detection function upon detecting occurrence of the color rolling, and to disable the color rolling detection function upon detecting no occurrence of the color rolling. Since the color rolling detection function is enabled only upon detection of a color rolling status, fading in color of an image generated by a high-speed shutter under some conditions can be prevented.

BRIEF DESCRIPTION OF THE DRAWINGS

The foregoing and other objects, features and advantages of the invention will become more apparent from the following description of embodiments of the invention with reference to the drawings, in which identical or like technical features or components will be denoted with identical or like reference numerals.

DETAILED DESCRIPTION OF THE INVENTION

Figure 1:
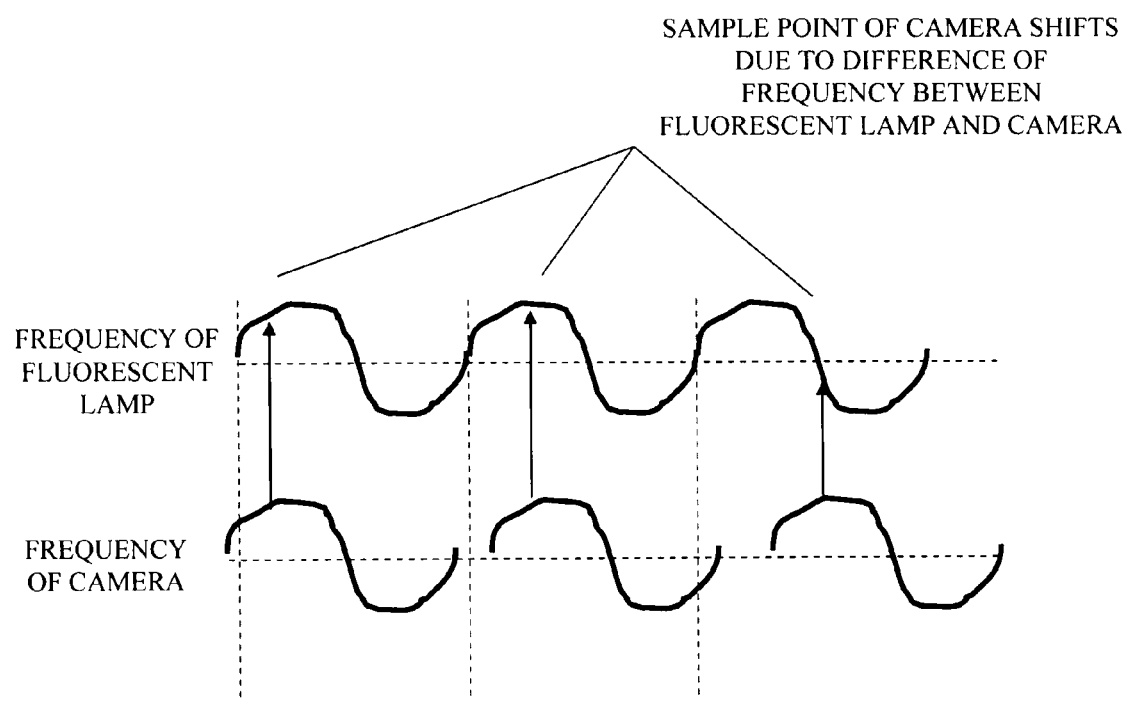
FIG. 1 is a schematic diagram of a principle on which a phenomenon of color rolling occurs.

The embodiments of the invention will be described below with reference to the drawings. An element and a feature described in a drawing or an embodiment of the invention can be combined with that illustrated in one or more other drawings or embodiments. It shall be noted that illustration and explanation of components and processes irrelevant to the invention and known to those ordinarily skilled in the art have been omitted in the drawings and the description for the sake of clarity.

In the embodiments of the invention, a corresponding process is performed on an image so as to detect color rolling. Specifically, a feature of color rolling distinguishable from noise is extracted based upon a preprocess performed on parameter values of representing the color or brightness of the image, that is, characteristic values deviate from an average value on the time axis of the characteristic values for a longer time during color rolling.

Figure 2:
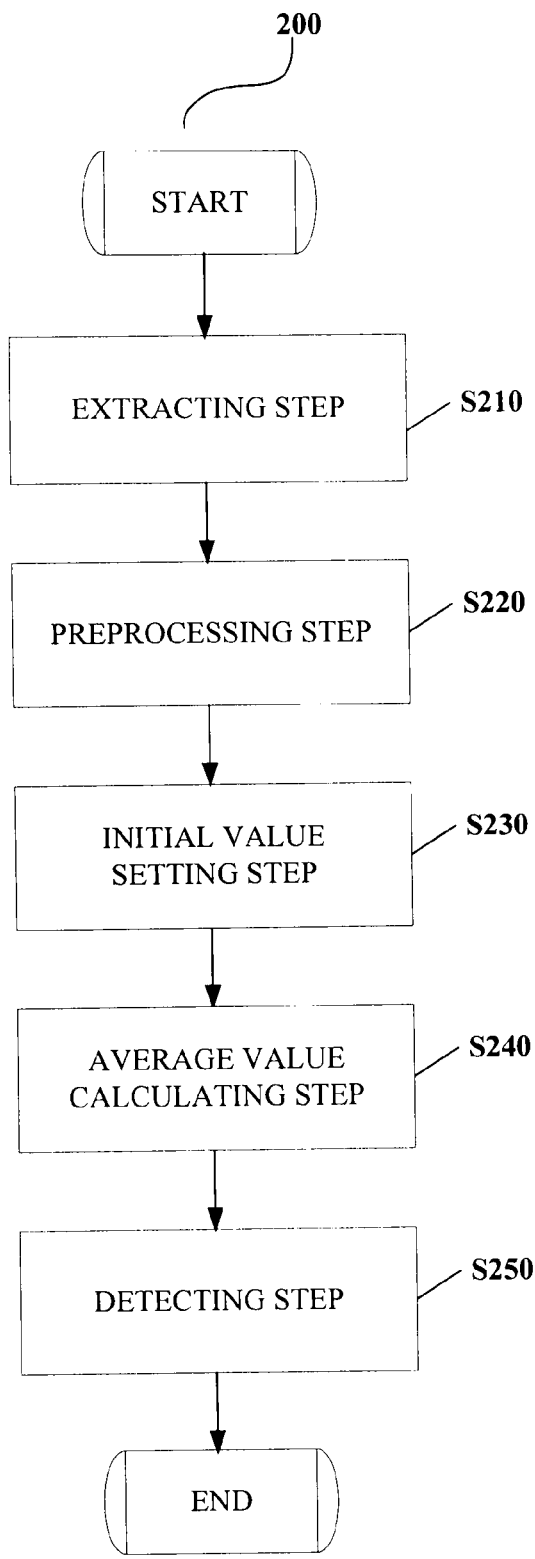
FIG. 2 is a simplified flow chart illustrating a color rolling detection method for an input image according to an embodiment of the invention.

FIG. 2 is a simplified flow chart illustrating a color rolling detection method 200 for an input image according to an embodiment of the invention. As illustrated in FIG. 2, parameter values indicative of the color or brightness of an image, e.g. detection values of white balance, etc., are extracted in a detection time period T3 in an extracting step S210 firstly. The detection time period T3 satisfies the following relationships: $T3=m\times T2$ ($m>1$) and $T3 \geq T/2$, where T2 represents a detection cycle in the detection time period T3, T represents a predetermined cycle of color rolling, and the detection cycle T2 satisfies the relationship of $T2<T/2$. The magnitude of the cycle of color rolling T is dependent upon, for example, characteristics of a surveillance camera with which the image is captured, conditions under which the surveillance camera is used, etc. Those skilled in the art can determine the magnitude of the cycle of color rolling T in a sample test. Furthermore, a user can select the value of m in a menu or by other means dependent upon an application. Alternatively, it is possible to determine a relatively reasonable initial value of m in a sample test while taking the characteristics of the camera into consideration, so that the color rolling occurs within an extent range acceptable to the user.

A preprocess is performed on the extracted parameter values so as to obtain characteristic values of the image in a preprocessing step S220. Illustrative but not limiting examples of the preprocess include: performing a normalization process after converting the parameter values indicative of the color of the image into brightness values; performing a normalization process after performing a difference and square operation on a ratio of the parameter values indicative of the color with respect to each sample point; or performing a normalization process to the parameter values indicative of the brightness of the image.

Next, an initial value of an average value in the following average value calculating step 240 is calculated from the characteristic values in an initialization time period of the detection time period T3 in an initial value setting step 230.

And then, with respect to each detection cycle T2 in the detection time period T3, the average value on the time axis of the characteristic values in the detection cycle T2 is calculated from the obtained initial value of the average value in the average value calculating step 240.

Next, it is detected in a detecting step S250 whether there exists in the detection time period T3 such a detection cycle T2 that the characteristic values in the detection cycle T2 always maintain a deviation in a specific direction relative to the average value of the characteristic values in the detection cycle T2 on the time axis. For example, the characteristic values can always remain below the average value of the characteristic values. Alternatively, the characteristic values can always remain above the average value of the characteristic values. If such a detection cycle T2 is detected as a result of detection, occurrence of color rolling can be determined; otherwise, no occurrence of the color rolling can be determined.

In a preferred embodiment, a judgment step for judging no or possible occurrence of color rolling can be added before the initial value setting step 230. In this judgment step, a certain physical quantity indicative of an occurrence degree of color rolling, e.g., the difference between the maximum value and the minimum value of the characteristic values in the detection time period T3, etc., is set and it is judged whether the physical quantity is greater than or equal to a predetermined level. If the physical quantity is greater than or equal to the predetermined level as a result of judgment, possible occurrence of color rolling can be determined, and the flow goes to the step S230. Otherwise, no occurrence of color rolling is determined and the flow ends. The user can select the predetermined level in a menu or by other means. Alternatively, it is possible to determine a relatively reasonable initial value of the predetermined level in a sample test while taking the characteristics of the camera into consideration, so that color rolling occurs within an extent range acceptable to the user. This step can be added to simplify the flow in case that it is necessary to detect no occurrence of color rolling. For example, during operation of the color rolling improvement function, it is necessary to detect rapidly nonexistence of a color rolling status once the image generated by a high-speed shutter fades in color because the color rolling status has been nonexistent, and hereby disabling the color rolling improvement function.

A flow chart of a specific example 300 for performing the color rolling detection method illustrated in FIG. 2 will be described with reference to FIG. 3 below. Before detection values of white balance are to be extracted, there exists an initialization step S301 in which the flow waits for a time period, for example, 5 sampling cycles T1, until detection values of automatically exposed image become stable. Then in a step S310, detection values R_DET, B_DET and G_DET of white balance for a high-speed shutter are extracted in each sampling cycle T1 within the detection time period T3. R_DET, B_DET and G_DET are indicative of integral values of primitive colors (Red, Blue and Green) components of a signal for pixels within a special brightness range, with regard to the image exposed at a high speed. Assumed the value of a red component for a certain pixel (n) within the special brightness range is R(n), and the total number of pixels within the special brightness range in the image exposed at the high speed is N, the detection value R_DET equals to $$\sum_{n=1}^{N} R(n).$$

Alike, the values of blue and green components B(n) and G(n) are integrated, and the detection values B_DET and G_DET can be represented respectively as follows:

$$B\_DET = \sum_{n=1}^{N} B(n) \text{ and } G\_DET = \sum_{n=1}^{N} G(n).$$

A method for extracting detection values of white balance is well known in the field of digital signal processing, and specific details thereof will not be described here. The detection time period T3 satisfies the relationships of T3=m×T2 (m>1) and T3≥T/2, where T represents a predetermined cycle of color rolling and T2 represents a detection cycle, and the detection cycle T2 satisfies the relationships of T2=n×T1 (n≥1) and T2<T/2. Herein, it is possible to determine the magnitude of the cycle of color rolling T and relatively reasonable, fixed initial values of m and n in a sample test while taking the characteristics of the camera into consideration, so that the color rolling occurs within an extent range acceptable by the user. For example, m is set to 5 and n is set to 20.

After that, a preprocess is performed on the extracted detection values in the step S320. For example, with respect to each sample point, a difference and square operation is performed on ratios of individual detection values to the detection value of a specific color, and then the result of calculation is normalized, so as to obtain characteristic values S1 of the image. For example, a calculation formula is (R_DET/G_DET−B_DET/G DET)². Herein, the ratios of the detection values are adopted for calculation so as to filter out the influence of noise, and the detection value of the green component is taken as a comparison reference because the green component is the color component preserved with the sharpest color. Those skilled in the art can alternatively adopt another color component as the comparison reference as needed. The foregoing result of calculation may include a decimal fraction and can be normalized into an integer ranging from 0 to 255 for facilitating a subsequent process. A normalization process is known to those skilled in the art, and a description thereof will be omitted here.

Thereafter the flow goes to a step S322 for determining whether a difference (specifically, the absolute value thereof) between the maximum value and the minimum value of the characteristic values S1 in the detection time period T3 is above a predetermined level. The predetermined level can vary in a range provided that color rolling occurs within an extent range acceptable by the user. Herein, it is possible to determine a relatively reasonable, fixed initial value of the predetermined level in a sample test while taking the characteristics of the camera into consideration. For example, the predetermined level of 25 is selected. If the absolute value of the difference between the maximum value and the minimum value of the characteristic values S1 is below the predetermined level as a result of determination, then no occurrence of color rolling is judged and the flow ends; otherwise, the flow goes to a step S330.

An initial value of the average value S2 in the following step S340 is set in the step S330. For example, the characteristic values S1 in the first 5 sampling cycles (the initialized period in T3) are used and an appropriate filter is adopted to derive the average value of these characteristic values on the time axis, as the initial value of the average value S2 in the following step S340. As fluctuation of S1 in a status of no color rolling is insignificant, a desired average value of S2 might be out of reach due to an issue of calculative precision regarding shift if the initial value were not appropriate. Therefore, a multi-status initialization method is adopted for initialization here. For rapid convergence of the initial value, a piecewise filtering with a ½ filter and a ¼ filter is adopted so that the initial value will be in a relatively reasonable range, where the filters are in the forms of S2=(S2*2−S2+S1+1)/2 and S2=(S2*4−S2+S1 +2)/4. The foregoing initialization time period can be included in or precede the first detection cycle T2.

The flow goes to a step S340 for calculating the average value S2 on the time axis of the characteristic values S1 in each detection cycle T2. Herein, an Infinite Impulse Response (IIR) filter is adopted to calculate the average value S2 on the time axis of the characteristic values S1 in each detection cycle T2, and the generally adopted filter is in the form of S2=(S2*64−S2+S1+32)/64 in view of the calculation amount. Those skilled in the art can alternatively adopt a filter in other form as needed. The result of calculation in the step S330 is used as the initial value of the average value S2 for calculating the average value S2 in the first detection cycle T2, and as regards calculation of the average value S2 in each of succeeding detection cycles T2, the result of calculating the average value S2 in a corresponding preceding detection cycle T2 is used as the initial value. That is, an iterative operation process is performed.

Then, it is detected in a step S350 whether there exists in the detection time period T3 such a detection cycle T2 that the characteristic values S1 in the detection cycle T2 always remain below the average value S2 thereof. Specifically, the first detection cycle T2 can be selected in a step S351, and next it is determined in a step S353 whether the characteristic values S1 in the first detection cycle T2 always remain below the average value S2 thereof. If the result of determination is positive, then occurrence of color rolling can be determined and the flow ends. If the characteristic values S1 in the first detection cycle T2 do not always remain below the average value S2 thereof, then it is determined in a step S355 whether the detection cycle T2 for which the step S353 has been performed is the last detection cycle T2 in the detection time period T3. If it is determined that the detection cycle T2 is not the last detection cycle T2 in the detection time period T3 as a result of determination, then the next detection cycle T2 is selected in a step S357 and the step S353 is performed for the selected detection cycle T2 until the last detection cycle T2 is selected. On the other hand, if it is determined that the detection cycle T2 is the last detection cycle T2 in the detection time period T3, which indicates that none of the detection cycles T2 satisfies the condition that the characteristic values S1 therein always remain below the average value S2 of the characteristic values S1 therein, then no occurrence of color rolling can be determined and the flow ends.

In a preferred embodiment, a control step, in which enabling of the color rolling improvement function can be automatically controlled in response to the result of detection in the step S350, can further be included. The color rolling improvement function can be enabled in case that the result of detection shows occurrence of color rolling, or can be disabled in case that the result of detection shows no occurrence of color rolling.

Figure 3:
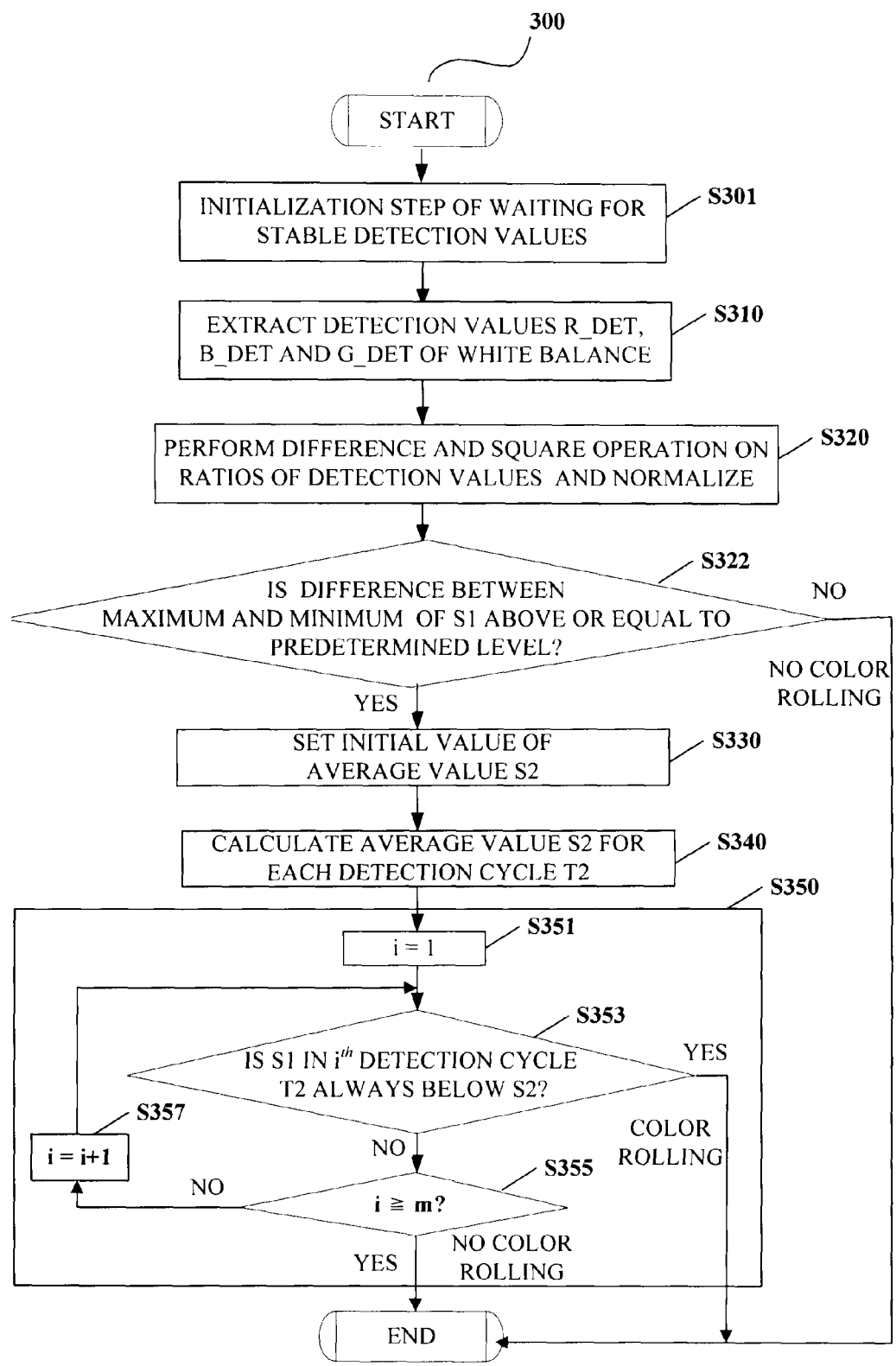
FIG. 3 is simplified flow chart illustrating a specific example of performing the color rolling detection method illustrated in FIG. 2.

In the detection flow 300 illustrated in FIG. 3, if a variation of the exposure status is detected so that valid detection data of white balance can not be acquired for a while, then the flow goes back to the step S301 to wait for stableness of the detection values and then the detection values are extracted again.

Figure 4:
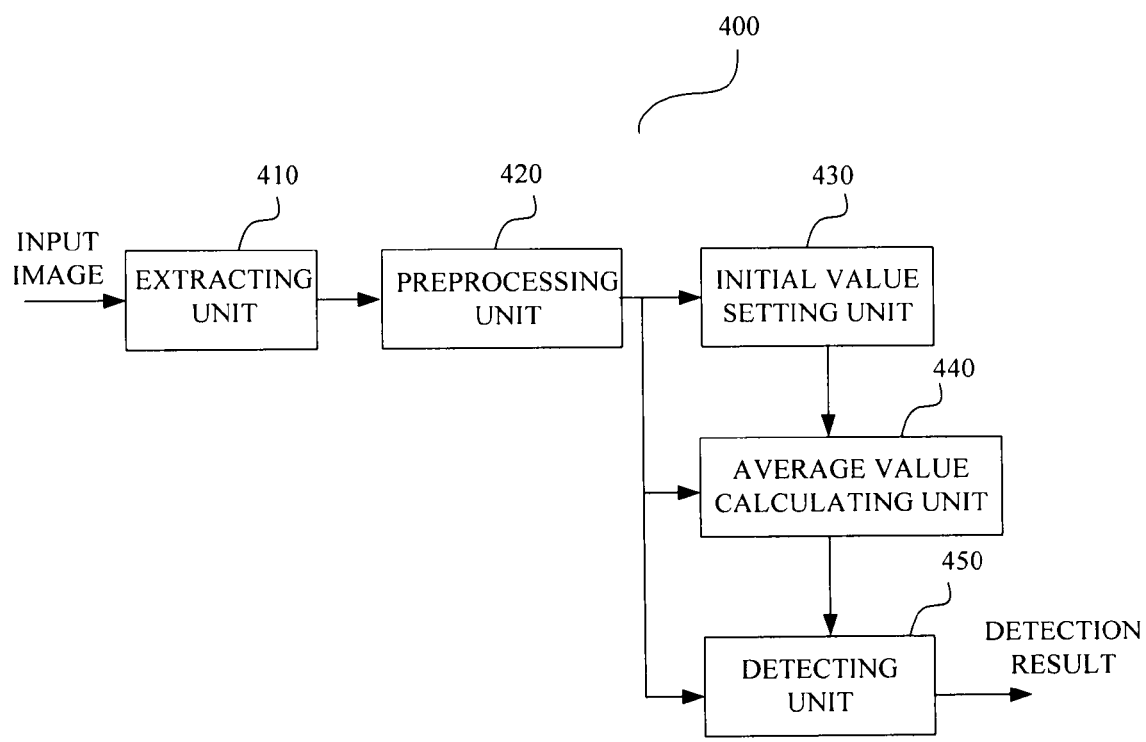
FIG. 4 is a simplified block diagram illustrating a color rolling detection device for an input image according to an embodiment of the invention.

Furthermore, another embodiment of the invention further provides a color rolling detection device for an input image. FIG. 4 illustrates a simplified block diagram of such a device 400. As illustrated, the device 400 includes an extracting unit 410, a preprocessing unit 420, an initial value setting unit 430, an average value calculation unit 440 and a detection unit 450. In operation, the extracting unit 410 is configured to extract, from an input image, parameter values indicative of the color or brightness of the image. The preprocessing unit 420 is configured to perform a preprocess on the extracted parameter values so as to obtain characteristic values of the image. The initial value setting unit 430 is configured to, based on the obtained characteristic values in an initialization time period of a detection time period T3, obtain an initial value for an average value calculation to be performed by the average value calculation unit 440. The average value calculating unit 440 is configured to calculate, for each detection cycle T2 in the detection time period T3, an average value on the time axis of the characteristic values in the detection cycle T2, according to the characteristic values obtained by the processing unit 420 and the initial value obtained by the initial value setting unit 430. The detecting unit 450 is configured to detect whether there exists in the detection time period T3 such a detection cycle T2 that the characteristic values in the detection cycle T2 always maintain a deviation in a specific direction relative to the average value on the time axis of the characteristic values in the detection cycle T2, wherein if such a detection cycle T2 is detected, the detection unit 450 outputs a detection result showing occurrence of color rolling; otherwise, it outputs a detection result showing no occurrence of color rolling.

The device 400 illustrated in FIG. 4 and the various units 410 to 450 included therein can be configured to perform the respective operations described above with reference to FIG. 2 and FIG. 3. For further details of these operations, reference can be made to the respective embodiments and examples described above, and no further detail thereof will be described here.

The color rolling detection device described above with reference to FIG. 4 can be arranged in various image pickup devices, e.g., a surveillance CCD camera so that the image pickup device can perform a rapid, efficient and accurate color rolling detection process.

Furthermore, the image pickup device can also enable the color rolling improvement function only upon detection of a color rolling status, to thereby avoid the foregoing adverse effect of fading in color of an image generated by a high-speed shutter under some conditions, which may result from the color rolling improvement function being enabled in the case of color rolling not being detected.

For example, the image pickup device can perform operations of detecting color rolling in respective steps of the color rolling detection method according to the embodiments of the invention. For specific details of the operations, reference can be made to the foregoing description of the color rolling detection method, for example, and a repeated description thereof will be omitted here. Therefore, such an image pickup device having a function of detecting the color rolling shall also be considered as coming to the scope of the invention.

The foregoing description has been given to embodiments accompanied by the block diagrams and/or flow charts, so as to set forth the respective embodiments of the device and/or method according to the invention. When one or more functions and/or operations are included in these block diagrams, flow charts and/or embodiments, those skilled in the art shall appreciate that the respective functions and/or operations in these block diagrams, flow charts and/or embodiments can be performed individually and/or collectively by a variety of hardware, software, firmware or any combination thereof In an embodiment, the several sections of the subject matter described in the present specification can be put into practice in an Application Specific Integrated Circuit (ASIC), a Field Programmable Gate Array (FPGA), a Digital Signal Processor (DSP) or another integral form. However, those skilled in the art will realize that some aspects of the embodiments described in the specification can be wholly or partially embodied equivalently in an integrated circuit in the form of one or more articles of computer program run on one or more computers (for example, in the form of one or more articles of computer program run on one or more computer systems), in the form of one or more articles of computer program run on one or more processors (for example, in the form of one or more articles of computer program run on one or more microprocessors), in the form of firmware or in the form of any combination thereof, and those skilled in the art benefiting from the contents in the disclosure of the specification can design circuits for the disclosure and/or write codes of software and/or firmware for the disclosure.

For example, the device 400 and the respective constituent modules, units and sub-units can be configured in software, firmware, hardware or any combination thereof. Upon implementing them in software or firmware, program constituting the software can be installed from a storage medium or a network to a computer with a structure of dedicated hardware (e.g., a general computer 500 illustrated in FIG. 5), and the computer can perform various functions when various articles of program are installed thereto.

Figure 5:
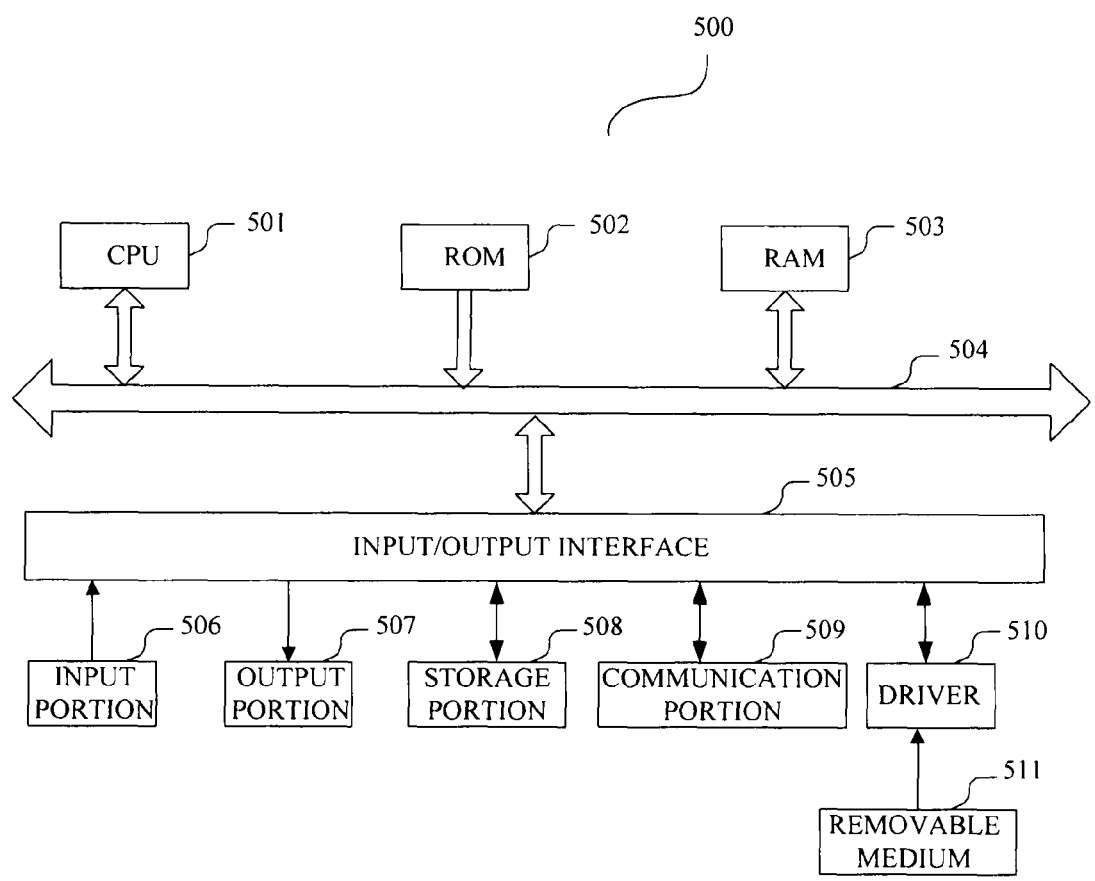
FIG. 5 is a schematic block diagram illustrating a computer in which the method and device according to the embodiments of the invention can be implemented.

FIG. 5 illustrates a schematic block diagram of a computer in which the method and device according to the embodiments of the invention can be implemented.

In FIG. 5, a Central Processing Unit (CPU) 501 performs various processes according to program stored in a Read Only Memory (ROM) 502 or loaded from a storage portion 508 to a Random Access Memory (RAM) 503. Data required for the CPU 501 to perform the various processes is also stored in the RAM 503 as needed. The CPU 501, the ROM 502 and the RAM 503 are connected with each other via a bus 504. An input/output interface 505 is also connected to the bus 504.

The following components are also connected to the input/output interface 505: an input portion (including a keyboard, a mouse, etc.), an output portion 507 (including a display, e.g., a Cathode Ray Tube (CRT), a Liquid Crystal Display (CRT), a speaker, etc.), a storage portion 508 (including a hard disk, etc.), a communication portion 509 (including a network interface card, e.g., a LAN card, a MODEM, etc.), etc. The communication portion 509 performs a communication process via a network, e.g., the Internet, etc. A driver 510 can also be connected to the input/output interface 505 as needed. The removable medium 511, e.g., a magnetic disk, an optical disk, an optic-magnetic disk, a semiconductor memory, etc., can be installed on the driver 510 as needed, so that computer program read therefrom can be installed into the storage portion 508 as needed.

In the case that the foregoing series of processes are performed in software, program constituting the software can be installed from a network, e.g., the Internet, etc., or from a storage medium, e.g., a removable medium 511, etc.

Those skilled in the art shall appreciate that the storage medium will not be limited to the removable medium 511 illustrated in FIG. 5, in which the program is stored and which is distributed separately from the device to provide a user with the program. Examples of the removable medium 511 include a magnetic disk (including a floppy disk), an optical disk (including a Compact Disk-Read Only Memory (CD-ROM) and a Digital Versatile Disk (DVD)), an optic-magnetic disk (including a Mini Disk (MD) (registered trademark)) and a semiconductor memory. Alternatively, the storage medium can be the ROM 502, the hard disk included in the storage portion 508, etc., in which the program is stored and which is distributed together with the device including the same to the user.

Therefore, the invention further provides a program product in which machine readable instruction codes are stored. Upon read and executed by a machine, the machine readable instruction codes can perform the foregoing respective methods according to the embodiments of the invention. Correspondingly, various storage media as listed above in which the program product is loaded will also come into the scope of the invention.

In the foregoing description of the embodiments of the invention, a feature described and/or illustrated in connection with an embodiment can be used equally or similarly in one or more other embodiments by being combined with or in place of a feature in the other embodiment.

It shall be noted that the term "include/comprise" as used in this context refers to presence of a feature, an element, a step or a component but will not preclude presence or addition of one or more such features, elements, steps or components.

Furthermore, the method according to the invention will not be restricted to being performed in the sequence as described in the specification but can also be performed in another sequence, in parallel or separately. Therefore, the sequence of performing the method as described in the specification will not set any limitation of the scope of the invention.

Although the invention has been disclosed as above through the description of the embodiments of the invention, it shall be appreciated that those skilled in the art can devise various modifications, alterations or equivalents of the invention without departing from the spirit and scope of the invention and those modifications, alterations or equivalents shall also be construed as coming into the scope of the invention.

The invention claimed is:

1. A color rolling detection method for an input image, comprising:
performing, by circuitry,
an extracting step for extracting parameter values indicative of color or brightness of the image in a detection time period T3 which satisfies relations of $T3=m \times T2$ and $T3 \geq T/2$, wherein T2 is representative of a detection cycle within the detection time period T3, T is representative of a predetermined color rolling cycle, and $m>1$, and the detection cycle T2 satisfies a relation of $T2<T/2$;
a preprocessing step for performing a preprocess to the extracted parameter values, so as to obtain characteristic values of the image;
an initial value setting step for obtaining a first initial value for calculating an average value of the characteristic values based on the characteristic values in an initialization time period of the detection time period T3;
an average value calculating step for calculating, with respect to each detection cycle T2 within the detection time period T3, the average value of the characteristic values in the detection cycle T2 on a time axis based on the obtained first initial value; and
a detecting step for detecting whether there exists in the detection time period T3 such a detection cycle T2 that the characteristic values within the detection cycle T2 always maintains a deviation in a certain direction relative to the average value of the characteristic values within the detection cycle T2 on the time axis, wherein if such a detection cycle T2 is detected, it is judged that color rolling occurs, otherwise it is judged that the color rolling does not occur.

2. The detection method according to claim 1, wherein the average value of the characteristic values within the detection cycle T2 on the time axis is calculated through an iterative process in said average value calculating step, wherein the first initial value obtained by the initial value setting step is used as an initial value for calculating the average value for a first detection cycle T2, and with respect to each detection cycle T2 except for the first detection cycle T2 within the detection time period T3, a result of calculating the average value for a detection cycle T2 directly previous to the detection cycle T2 is used as an initial value for calculating the average value for the detection cycle T2.

3. The detection method according to claim 1, wherein, during said initial value setting step, a first filter is used to obtain the average value of said characteristic values in the initialization time period of the detection time period T3 on the time axis as the first initial value of the average value for the average value calculating step, and during said average value calculating step, a second filter is used to calculate the average value of the characteristic values in the detection cycle T2 on the time axis.

4. The detection method according to claim 3, wherein the process performed by the first filter is represented by at least one of relations of $S2=(S2*2-S2+S1+1)/2$ and $S2=(S2*4-$ S2+S1+2)/4, and the process performed by the second filter is represented by a relation of S2=(S2*64−S2+S1+32)/64, wherein S1 is representative of said characteristic values, and S2 is representative of the average value of said characteristic values on the time axis.

5. The detection method according to claim 1, wherein one of the following preprocesses is executed by said preprocessing step:

performing a normalization process after converting the parameter values indicative of the color of the image into brightness values;

performing a normalization process after performing a difference and square operation on a ratio of the parameter values indicative of the color of the image with respect to each sampling point of the extracting step; and performing a normalization process to the parameter values indicative of the brightness of the image.

6. The detection method according to claim 1, wherein said deviation comprises one of the following:

the characteristic values in the detection cycle T2 always keep smaller than the average value of the characteristic values in the detection cycle T2 on the time axis; and the characteristic values in the detection cycle T2 always keep greater than the average value of the characteristic values in the detection cycle T2 on the time axis.

7. The detection method according to claim 1, further comprising a color rolling no occurrence judging step after the preprocessing step and before the initial value setting step, for setting a certain physical quantity indicative of an occurrence degree of the color rolling and judging whether the physical quantity is greater than or equal to a predetermined level, and determining no color rolling occurs in case that the physical quantity is smaller than the predetermined level.

8. The detection method according to claim 7, wherein said physical quantity is a difference between the maximum value and the minimum value of the characteristic values in the detection time period T3.

9. The detection method according to claim 1, further comprising a controlling step for enabling a color rolling improvement function in case that occurrence of the color rolling is detected in the detecting step, and prohibiting the color rolling improvement function in case that no occurrence of color rolling is detected.

10. The detection method according to claim 1, wherein said parameter values are integral values R_DET, B_DET and G_DET respectively of red, blue and green signal components of the inputted image for pixels with brightness within a special range, and in said preprocessing step, for each sampling point, an arithmetic expression $(R\_DET/G\_DET - B\_DET/G\_DET)^2$ is used to perform a calculation and a normalization process is performed to the calculation result, so as to obtain said characteristic values of the image.

11. A color rolling detection device for an input image, comprising:

circuitry configured to extract parameter values indicative of color or brightness of the image in a detection time period T3 which satisfies the relations of T3=m×T2 and T3≥T/2, wherein T2 is representative of a detection cycle within the detection time period T3, T is representative of a predetermined color rolling cycle, and m>1, and the detection cycle T2 satisfies a relation of T2<T/2;

perform a preprocess to the extracted parameter values so as to obtain characteristic values of the image;

obtain a first initial value for calculating an average value of the characteristic values based on the characteristic values in an initialization time period of the detection time period T3;

calculate, for each detection cycle T2 in the detection time period T3, the average value of the characteristic values in the detection cycle T2 on a time axis based on the obtained first initial value; and detect whether there exists in the detection time period T3 such a detection cycle T2 that the characteristic values within the detection cycle T2 always maintain a deviation in a certain direction relative to the average value of the characteristic values within the detection cycle T2 on the time axis, wherein if such a detection cycle T2 is detected, a detection result that color rolling occurs is obtained, and if such a detection cycle T2 is not detected, a detection result that the color rolling does not occur is obtained.

12. An image pickup equipment equipped with the device according to claim 11.

13. A non-transitory computer-readable medium including machine-readable instruction code, when said instruction code is read and executed by a machine, the following steps can be executed:

an extracting step for extracting parameter values indicative of color or brightness of the image in a detection time period T3 which satisfies relations of T3=m×T2 and T3≥T/2, wherein T2 is representative of a detection cycle within the detection time period T3, T is representative of a predetermined color rolling cycle, and m>1, and the detection cycle T2 satisfies a relation of T2<T/2;

a preprocessing step for performing a preprocess to the extracted parameter values, so as to obtain characteristic values of the image;

an initial value setting step for obtaining a first initial value for calculating an average value of the characteristic values based on the characteristic values in an initialization time period of the detection time period T3;

an average value calculating step for calculating, with respect to each detection cycle T2 within the detection time period T3, the average value of the characteristic values in the detection cycle T2 on a time axis based on the obtained first initial value; and a detecting step for detecting whether there exists in the detection time period T3 such a detection cycle T2 that the characteristic values within the detection cycle T2 always maintains a deviation in a certain direction relative to the average value of the characteristic values within the detection cycle T2 on the time axis, wherein if such a detection cycle T2 is detected, it is judged that color rolling occurs, otherwise it is judged that the color rolling does not occur.

14. The non-transitory computer-readable medium including according to claim 13, wherein the average value of the characteristic values within the detection cycle T2 on the time axis is calculated through an iterative process in said average value calculating step, wherein the first initial value obtained by the initial value setting step is used as an initial value for calculating the average value for a first detection cycle T2, and with respect to each detection cycle T2 except for the first detection cycle T2 within the detection time period T3, a result of calculating the average value for a detection cycle T2 directly previous to the detection cycle T2 is used as an initial value for calculating the average value for the detection cycle T2.

15. The non-transitory computer-readable medium including according to claim 13, wherein, during said initial value setting step, a first filter is used to obtain the average value of said characteristic values in the initialization time period of the detection time period T3 on the time axis as the first initial value of the average value for the average value calculating step, and during said average value calculating step, a second filter is used to calculate the average value of the characteristic values in the detection cycle T2 on the time axis, wherein the process performed by the first filter is represented by at least one of relations of S2=(S2*2−S2+S1+1)/2 and S2=(S2*4−S2+S1 +2)/4, and the process performed by the second filter is represented by a relation of S2=(S2*64−S2 +S1 +32)/64, wherein S1 is representative of said characteristic values, and S2 is representative of the average value of said characteristic values on the time axis.

16. The non-transitory computer-readable medium including according to claim 13, wherein one of the following preprocesses is executed by said preprocessing step:

performing a normalization process after converting the parameter values indicative of the color of the image into brightness values;

performing a normalization process after performing a difference and square operation on a ratio of the parameter values indicative of the color of the image with respect to each sampling point of the extracting step; and performing a normalization process to the parameter values indicative of the brightness of the image.

17. The non-transitory computer-readable medium including according to claim 13, wherein said parameter values are integral values R_DET, B_DET and G_DET respectively of red, blue and green signal components of the inputted image for pixels with brightness within a special range, and in said preprocessing step, for each sampling point, an arithmetic expression $(R\_DET/G\_DET - B\_DET/G\_DET)^2$ is used to perform a calculation and a normalization process is performed to the calculation result, so as to obtain said characteristic values of the image, wherein said deviation comprises one of the following:

the characteristic values in the detection cycle T2 always keep smaller than the average value of the characteristic values in the detection cycle T2 on the time axis; and the characteristic values in the detection cycle T2 always keep greater than the average value of the characteristic values in the detection cycle T2 on the time axis.

18. The non-transitory computer-readable medium including according to claim 13, when said instruction code is read and executed by a machine, a color rolling no occurrence judging step can further be executed after the preprocessing step and before the initial value setting step, the color rolling no occurrence judging step including setting a certain physical quantity indicative of an occurrence degree of the color rolling and judging whether the physical quantity is greater than or equal to a predetermined level, and determining no color rolling occurs in case that the physical quantity is smaller than the predetermined level, wherein said physical quantity is a difference between the maximum value and the minimum value of the characteristic values in the detection time period T3.

19. The non-transitory computer-readable medium including according to claim 13, when said instruction code is read and executed by a machine, a controlling step can further be executed, the controlling step used for enabling a color rolling improvement function in case that occurrence of the color rolling is detected in the detecting step, and for prohibiting the color rolling improvement function in case that no occurrence of color rolling is detected.

* * * * *